Feb. 15, 1966  E. F. FREKKO  3,234,628
CAPACITOR MANUFACTURE
Filed Nov. 26, 1962
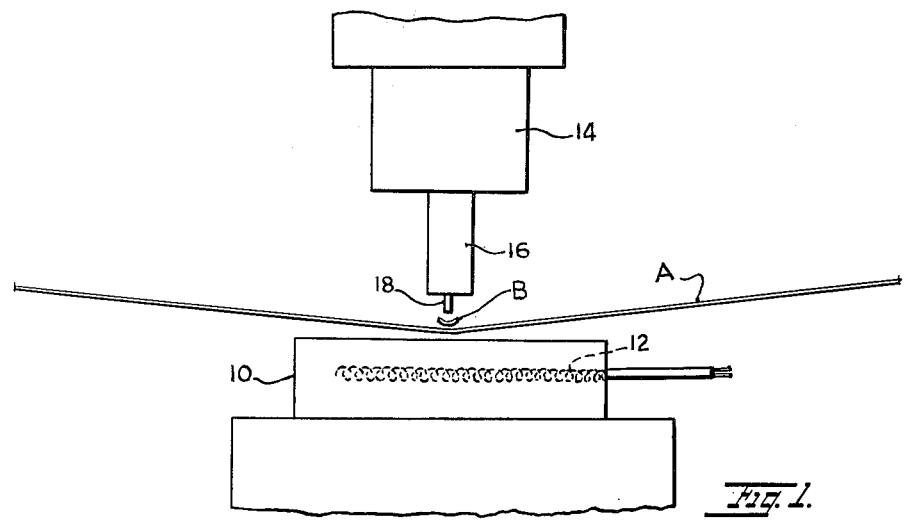
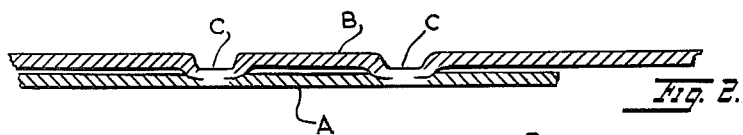
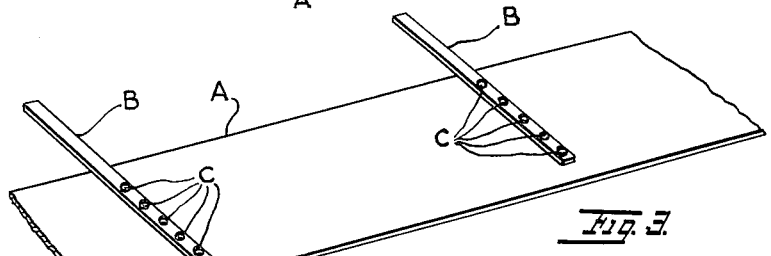
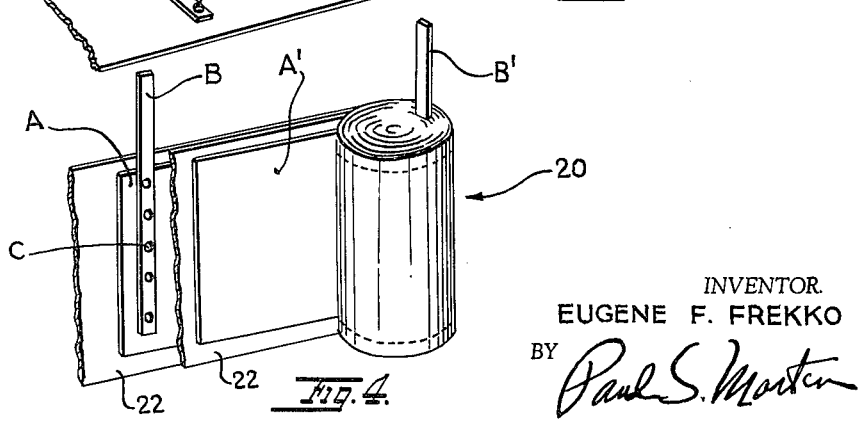
INVENTOR.
EUGENE F. FREKKO
BY
*Paul S. Martin*
ATTORNEY

3,234,628
CAPACITOR MANUFACTURE
Eugene F. Frekko, Sanford, N.C., assignor to Cornell-Dubilier Electric Corporation, a corporation of Delaware
Filed Nov. 26, 1962, Ser. No. 239,989
3 Claims. (Cl. 29—25.42)

The present invention relates to aluminum welding. More particularly, the invention relates to aluminum electrolytic capacitors and to the manufacture of electrolytic capacitors having aluminum foil electrodes and an aluminum terminal lead or tab as of wire or a strip of metal foil.

It has been a long-standing problem to unite two parts of aluminum to each other. Electrical resistance welding has been tried, with some success in particular circumstances, and cold-welding has also been proposed. My experinece with cold-welding has been a record of repeated failures. Cold-weld experts have suggested to me that the welding tools that I used were not of the proper critical shapes and that the aluminum surfaces to be welded were not sufficiently clean. Whatever the difficulty may be, it is apparent that critical and somewhat obscure considerations are involved. It is an object of the present invention to provide a novel method of welding parts of aluminum together without being dependent upon critical surface preparation and without being dependent on critical shapes of welding tools.

The welding of aluminum is a particular problem in the manufacture of electrolytic capacitors having aluminum-foil electrodes and having aluminum terminals as of wire or foil strips. The connection has been made between the terminal element and the foil electrode in various ways, as by folding one or more turns of the foil around the tab and staking the two together, and in various other ways. For some applications of aluminum electrolytic capacitors, such mechanically formed connections have not been considered sufficiently reliable. Furthermore, the problem of making an appropriate joint is complicated by the requirements that, in the finished capacitor, both the aluminum-foil electrode and the terminal connector are to be "formed," a treatment that results in an oxide surface being developed on the aluminum parts. The necessity of having an oxide surface on the electrode has heretofore been considered a prominent source of difficulty in making a proper connection between the foil and the tab if the foil is formed before the joint is made. If a joint is made by shearing action as in a staking operation, bare metal surfaces are formed and are mechanically forced into contact with each other, and these bare metal surfaces are later subjected to forming conditions when exposed to electrolyte in the completed capacitor. This might result in the formation of oxides at the metal interfaces of the joints, thus producing a poor electrical connection. If the joint is made before the forming treatment is carried out, the manufacture of the capacitors is complicated. It then becomes necessary to anodically form the foil with its attached terminal wire or tab, and this commonly leads to the processing of individual electrode-and-terminal anode units, entailing uneconomical handling of many separate electrodes.

It is an important object of the present invention to provide a novel method of joining aluminum parts together, for example two pieces of foil, or a piece of foil and a tab strip, or aluminum foil and a terminal wire, without dependence upon critical surface preparation of the aluminum parts involved.

A further object of the invention is to provide a novel method of manufacture of aluminum electrolytic capacitors. This aspect of the invention is achieved, as will be seen in greater detail below, by first anodically forming the aluminum foil or both the aluminum foil and the terminal wire or foil tab, and then uniting the terminal and the foil without resort to localized cleaning. I have found that excellent welds can be made quickly between anodically formed aluminum foil and a wire or tab terminal which may also have a surface that is anodically formed before the connection is made. In the process the two parts are subjected to a high order of localized pressure, and they must be moderately heated. I have found that the formed surface, which is an oxide-bearing surface, does not interfere with the formation of a good weld, both from the point of view of good electrical conductivity and adequate mechanical strength. In fact, the formed surface seems actually to promote more consistent success and achieves stronger welds. Through the use of this method, aluminum foil can be subjected to the usual forming treatment as a continuous strip and the terminals in the form of foil strips or wires can be welded to the formed foil. The strip can thereafter be cut into individual tab-bearing foil electrodes. The process involves obvious economy from the point of view of mass production. Further, the welded joint can be made quite compact so that miniature capacitors can be made without undue loss of space at the foil-to-tab connection. It will be appreciated that a simple foil-to-terminal well represents the minimum size of joint, omitting folds, etc., characteristic of other connections. Additionally, the joint is mechanically secure against vibration and it exhibits high reliability electrically during life of the capacitor, despite the tendency of exposed aluminum surfaces when exposed to electrolyte to become anodized when the capacitor is in use.

The nature of the invention and its various aspects and further features of novelty will be recognized and more fully appreciated from the following detailed description of an illustrative embodiment, in which reference is made to the accompanying drawings.

In the drawings:
FIG. 1 is a diagrammatic illustration of apparatus utilized in carrying out the invention;
FIG. 2 is a diagrammatic illustration of two aluminum parts united pursuant to features of the present invention, the thicknesses being greatly exaggerated;
FIG. 3 illustrates, in perspective, a portion of an aluminum strip bearing tab terminals united to the foil in accordance with the present invention; and
FIG. 4 is a diagrammatic prespective view of a wound capacitor section.

In FIG. 1 there is shown diagrammatically a piece of equipment used in making welds between two aluminum parts. A steel block 10 is shown containing an electric heating element 12, suitably insulated from block 10. An appropriate source of current and suitable temperature-control means will also normally be included in such apparatus. An air cylinder 14 is disposed above block 10, and a shaft 16 extends from air cylinder 14, so as to be operable in a downward power stroke. A tool 18 is fixed in the lower end of shaft 16. Tool 18, is, suitably, of steel.

In a practical example of such equipment, air cylinder 14 had a piston area of four square inches and tool 18 was a circular rod with a flat end but with rounded edges, having a diameter of 0.082 inch or 0.0053 square inch. Air pressures of between 40 lbs. per square inch and 60 lbs. per square inch were used in cylinder 14, producing pressures at the tool face computed to be between 30,000 lbs. per square inch and 45,000 lbs. per square inch. The larger values of pressure are used with greater thicknesses of material. Aluminum foil of 0.0016 to 0.004 inch thickness have been welded to tabs of various thicknesses, from 0.007 inch aluminum foil up to and including flattened #14 aluminum wire and round #16 aluminum wire, the alumnum being of the high purity customary in capacitor manufacture, generally in excess of 99.5%.

As shown in FIG. 1, the aluminum foil A is supported on block 10, and the tab B is placed on the foil under tool 18. Pressure is built up in the air cylinder and the pressure is applied and maintained momentarily so as to squeeze the tab B and the foil A together, long enough for the temperature of the aluminum between block 10 and tool 18 to reach the temperature of block 10, to a close approximation.

Parts of aluminum have been successfully joined using the apparatus in FIG. 1, but it was always necessary to use a minimum temperature at the surface of block 10 of 210° F., to a maximum of about 450° F. at which there was a tendency of the aluminum parts to stick to the block and the tool. Using metals other than steel for block 10 and tool 18 may well reduce the tendency of the aluminum to stick, so that this upper temperature is not technically a limitation on the welding step. FIG. 2 illustrates the resulting welds C, two welds C being shown joining tab B to foil A. The combined thickness of the parts at the weld is reduced to about 50% of the separate thicknesses of the overlying metal parts, this reduction being due to deformation and plastic flow of the metal under the tool 18.

FIG. 3 shows a series of terminal tabs B joined to a continuous length of foil A. This foil is advantageously formed in the manner appropriate to impart desired capacitor characteristics, which leaves a coating of oxide all over the foil. Thereafter the tabs B are welded to the foil. The tabs are also formed, preferably, before the welds are made. It is of distinct advantage that both aluminum parts are formed under controlled conditions, where such parts are later exposed to the electrolyte that forms art of the completed aluminum electrolytic capacitor. In the welding method described, the formed character of the surface or both surfaces apparently promotes good welding, and clearly does not interfere with such a weld.

Strip A (FIG. 3) is cut into units each including a terminal tab, but no forming treatment is needed to complete the formed film at the cut edges of the foil. This is because the completed capacitor undergoes an aging process in which forming voltage is applied to the electrodes which are immersed in the electrolyte forming part of the capacitor, and this produces a formed film at all bare surfaces. Referring to FIG. 4 the wound capacitor section 20 is formed from two foils A, A' each having an associated tab B, B' which extends outwardly beyond the margin of the interleaved porous separators 22. The separators hold the electrolyte in the completed capacitor. The welds C joining the tabs to the foil in this completed capacitor have demonstrated long life and sustained high electrical conductivity during life.

It will be observed that multiple welds C are formed along each terminal tab. These may be formed simultaneously, by providing tool 18 with an appropriate number of pressure faces. The weld-forming operation involves no critical treatments, inasmuch as successful welds are produced on a routine basis with various surface characteristics and with flat pressure surfaces on the block 10 and on tool 18, and no welding current is involved.

The optimum temperature range for joining formed foil to a formed or an unformed foil tab, both of aluminum, is 290° F. to 350° F.

A typical forming treatment for aluminum involves subjecting the foil to anodic treatment in 8% boric acid aqueous solution containing .05% borax, at 85° C. A D.-C. voltage is applied between the foil as the anode and an inert cathode such as a stainless steel tank as cathode. This voltage is started at a low value, and is increased progressively over a period of about 20 minutes until the desired voltage is reached, which depends upon the rating of the capacitor to be made. The terminal-tab material can be anodized in like manner or, if desired, the tab may be bare metal when welded to the formed foil and the surface of the tab may be anodically formed during aging of the capacitor as described above.

Successful joints have been made through this use of heat and pressure with various surfaces on the parts. Previous surface treatments have an influence on the optimum welding conditions, but successful joints have been made with heat and pressure where, before the weld, both the foil and the tab were clean and shiny as supplied commercially (but inherently having a theoretical covering of oxide, perhaps one molecule in thickness), and where the tab was anodically formed and the foil was clean and shiny, and where the foil was anodically formed and the tab B was either shiny or formed, and where the foil was chemically etched (as is customary in capacitor manufacture to multiply the surface area) and the tab was formed.

Investigation demonstrates that successful welds can readily be made where the clean and shiny aluminum as usually supplied is subjected to prolonged boiling in water, even where etched aluminum is boiled in water long enough to develop a prominently darkened surface that represents an oxide coating. Both the formed oxide and the oxide that results from boiling are hydrated, the formed oxide being only partly hydrated. Other anodic treatments are also effective in producing oxide surfaces on the aluminum preparatory to welding, as by conventional anodizing. Anodic treatment in 10 to 40% sulfuric acid and in 10 to 40% chromic acid are examples of such treatments. Notably, the resulting oxide is a thick coating that differs from the one-molecule-thick film that theoretically is present on all aluminum surfaces.

The electrodes made by cutting foil A (FIG. 3) into separate parts, one tab to each length of foil, are wound with paper separators and another electrode which may be unformed in the case of a polarized capacitor or it may be formed in the case of a non-polarized capacitor. The assembly is impregnated with an electrolyte, aged, assembled in a container, and sealed.

As a preparatory treatment for aluminum that is compatible with the welding method described, the aluminum may be etched. To a degree the etching appears to promote better welding. Etching is a usual step performed in the manufacture of aluminum electrolytic capacitors, before the forming process. Etching may be carried out in many ways. In one example the aluminum foil is subjected to approximately 20% HCl solution at about 75° C. for approximately 2 minutes, giving a greatly multiplied surface area desirable in electrolytic capacitor. In another surface area desirable in electrolytic capacitors. In another by making it the anode in a sodium chloride solution of about 8% concentration, at a temperature of about 95° C. for about 20 minutes at about 12 volts.

The aforedescribed method results in the production of capacitors having higher reliability than has heretofore been obtained on a mass production basis. It will be obvious to those skilled in the art that various changes and modifications may be made therein without departing from the spirit and teachings of the invention.

What is claimed is:

1. The method of manufacturing aluminum electrolytic capacitors, including the steps of anodically forming a continuous strip of aluminum foil, squeezing a series of aluminum terminals against said formed foil at spaced locations with sufficient pressure to effect about 50% reduction in thickness of both the foil and the terminals in the region of pressure application while heating the squeezed material at a temperature in the range of 290° F. to 350° F., and subdividing the strip into electrodes each having a terminal.

2. The method of manufacture of aluminum electrolytic capacitors, including the steps of anodically forming a continuous strip of aluminum foil, and using said formed foil to make electrodes by squeezing an aluminum terminal against a unit length of said foil with sufficient pressure over a definite area to effect substantial reduction of thickness of about 50% in said area thereof while heating the squeezed material to a temperature in the range of 290° F. to 350° F.

3. An electrolytic capacitor having aluminum-foil electrodes at least one of which is formed and has an aluminum terminal element welded to the foil in accordance with claim 2.

References Cited by the Examiner
UNITED STATES PATENTS

| | | | |
|---|---|---|---|
| 2,707,826 | 5/1955 | Sowter | 29—470.1 |
| 3,100,933 | 8/1963 | Hancock | 29—470.1 |

OTHER REFERENCES

Bell Laboratories Record, pages 127–130, April 1958.
D 16645 Ib/49h, August 1956, Germany.

RICHARD H. EANES, JR., *Primary Examiner.*